Oct. 9, 1945.  H. T. KRAFT  2,386,477
BRAKE OR CLUTCH
Filed March 29, 1943  6 Sheets-Sheet 3

INVENTOR
Herman T. Kraft
BY Evans + McCoy
ATTORNEYS

Oct. 9, 1945. H. T. KRAFT 2,386,477
BRAKE OR CLUTCH
Filed March 29, 1943 6 Sheets-Sheet 4

INVENTOR
Herman T. Kraft
BY Evans + McCoy
ATTORNEYS

Oct. 9, 1945.  H. T. KRAFT  2,386,477
BRAKE OR CLUTCH
Filed March 29, 1943  6 Sheets-Sheet 5

INVENTOR
*Herman T. Kraft*
BY *Evans & McCoy*
ATTORNEYS

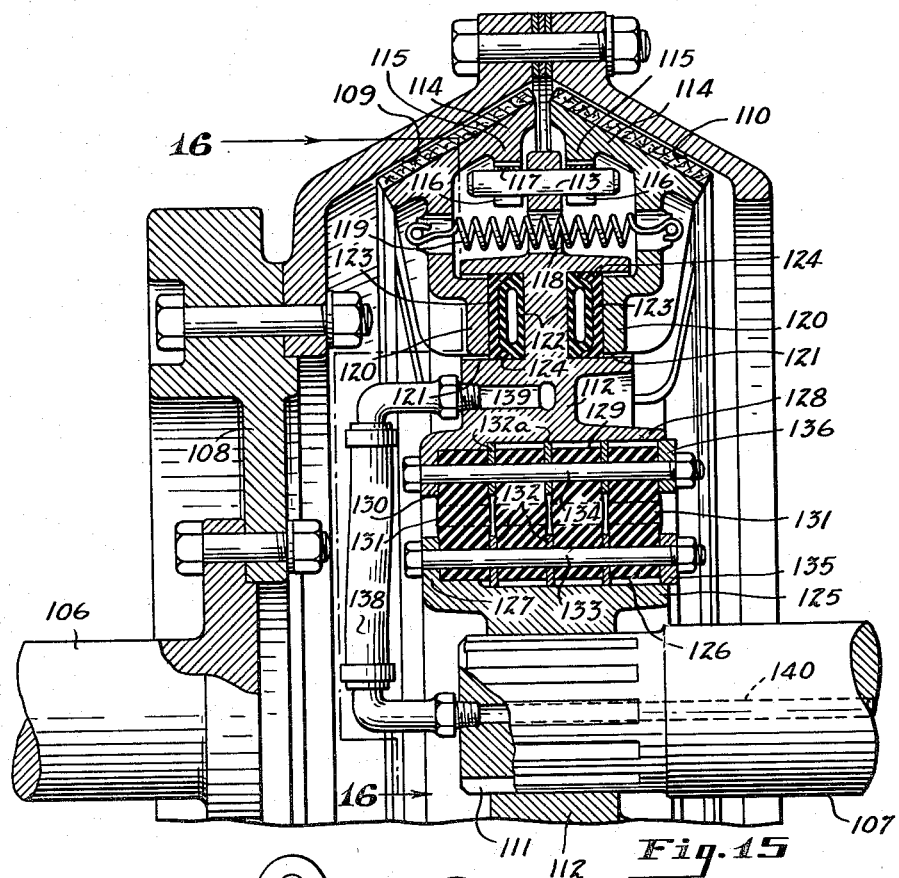
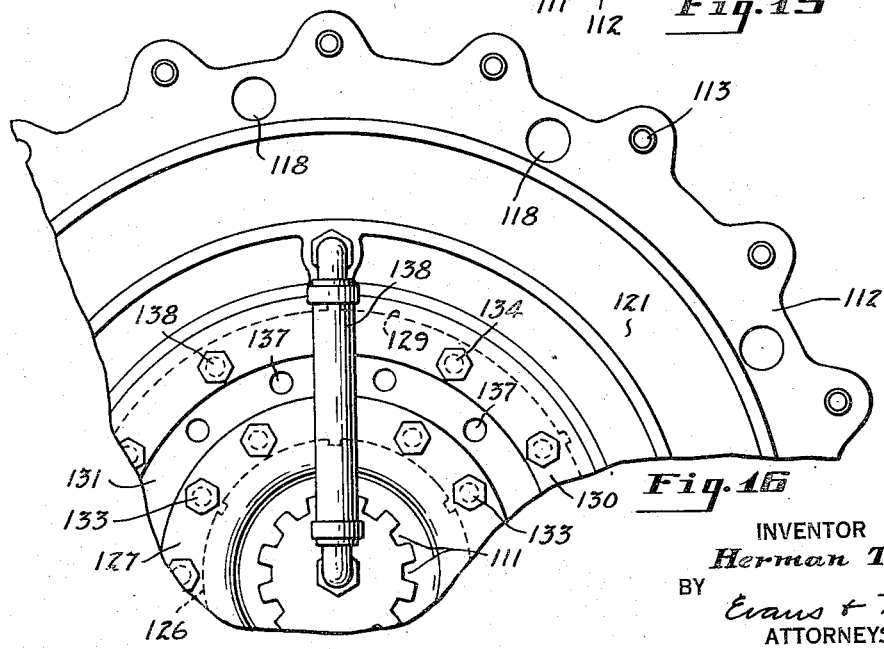

Patented Oct. 9, 1945

2,386,477

UNITED STATES PATENT OFFICE 2,386,477

BRAKE OR CLUTCH

Herman T. Kraft, Akron, Ohio, assignor to The General Tire & Rubber Company, Akron, Ohio, a corporation of Ohio Application March 29, 1943, Serial No. 480,906

35 Claims. (Cl. 188—152)

This invention relates to an improved heavy-duty brake or clutch and a combined aircraft landing wheel and brake, the present application being a continuation-in-part of my copending application Serial No. 446,356, filed June 9, 1942 now abandoned.

This invention has for an object to provide a simple and compact brake or clutch mechanism which includes a resiliently mounted friction element and which has a high torque-absorbing capacity.

A further object of the invention is to provide a heavy-duty brake or clutch mechanism which has an internal annular friction member mounted on a torque disk for axial movement toward or away from an external annular friction member and connected to the torque disk by means of yieldable centering and torque-transmitting connections.

A further object is to provide a mechanism of the character referred to which has interengaging conical friction members of small taper and relatively large engaging surfaces, the internal friction member having torque-transmitting connection to a supporting member which has a radius which is approximately the same as that of the large ends of the conical friction members.

Further objects of the invention are to provide improved means for actuating the movable friction members and improved means for adjusting one of the friction members relative to the other to compensate for wear.

A further object of the invention is to provide an airplane landing wheel of simple and compact construction, which has an interior brake capable of applying adequate retarding torque.

A further object of the invention is to provide a mounting for the wheel on its axle which will permit free expansion or contraction of the wheel body due to heat without subjecting the wheel body to objectionable stresses.

A further object of the invention is to provide a wheel and brake unit in which both the tire and the brake-operating mechanism are effectively protected against the transfer of an excessive amount of heat from the friction brake elements.

A further object of the invention is to provide a wheel which may be quickly and easily removed from the axle and which may be taken apart after removal for repair of the tire or brake mechanism, or both.

With the above and other objects in view, the invention may be said to comprise the device illustrated in the accompanying drawings, hereinafter described, and particularly set forth in the appended claims, together with such variations and modifications thereof as will be apparent to one skilled in the art to which the invention pertains.

Reference should be had to the accompanying drawings forming a part of this specification, in which:

Fig. 15 is a sectional view showing a clutch embodying the invention; and

Fig. 16 is a fragmentary side elevation of the torque disk shown in Fig. 15.

Figure 1:
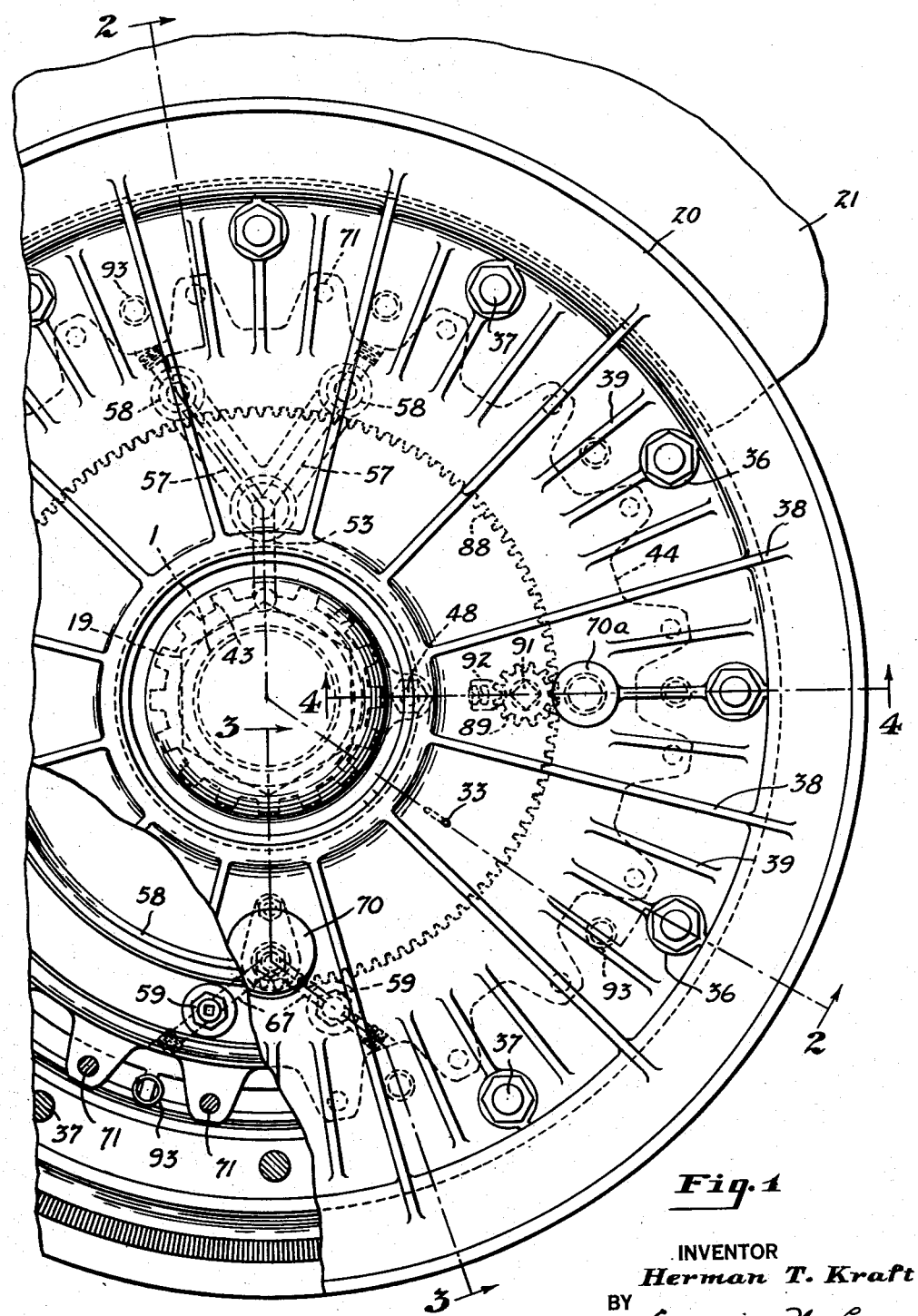
Figure 1 is a side elevation of an aircraft landing wheel with a built-in brake embodying the invention.
Figure 2:
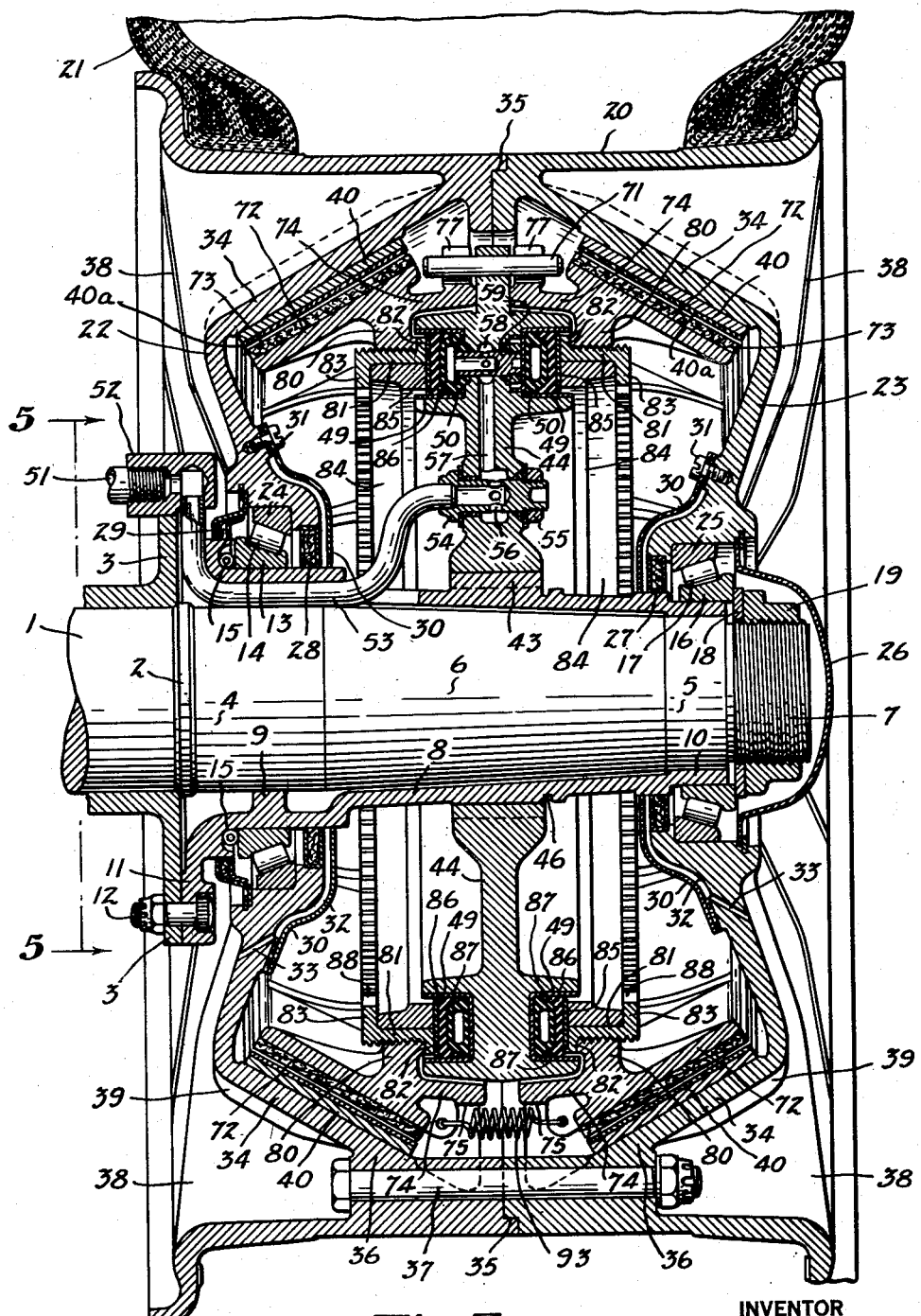
Fig. 2 is an axial section taken on the line indicated at 2—2 in Fig. 1.

In Figs. 1 to 14, inclusive, of the drawings, the invention is shown applied to a combined brake and wheel suitable for an airplane landing wheel. The wheel and brake of the present invention are shown mounted on an axle I which is provided with a rib 2 spaced inwardly from the end thereof and has a flange 3 rigidly attached thereto adjacent the rib 2. The wheel-receiving portion of the axle outwardly of the rib 2 has an inner cylindrical seating portion 4 adjacent the rib 2, a second cylindrical seating portion 5 adjacent its outer end, which is of smaller diameter than the seating portion 4, and a tapering portion 6 between the seating portions 4 and 5, the axle being provided with a reduced threaded portion 7 outwardly of the seating portion 5.

A quill 8 is mounted on the axle 1 and is provided with an inner seating portion 9 that fits on the seating portion 4 of the axle and an outer seating portion 10 that fits upon the outer seating portion 5 of the axle. At its inner end, the quill is provided with a flange 11 which abuts the flange 3 of the axle and is detachably secured to the flange 3 by means of attaching bolts 12. An inner race ring 13 of a roller bearing 14 is mounted upon the quill 8 adjacent the flange 11 and a ring 15, formed of a helical wire spring of small diameter and relatively long pitch, is interposed between the ring 13 and the flange 11. On the outer end of the quill there is mounted the inner race ring 16 of a roller bearing 17. The race ring 16 is held in place by a washer 18 and nut 19 screwed on the threaded end 7 of the axle.

A wheel mounted on the bearings 14 and 17 comprises a wide rim 20 providing a seal for a pneumatic tire 21 and side disks 22 and 23, which have quill receiving apertures in which the outer race rings 24 and 25 of the roller bearings 14 and 17 are mounted. The wheel body, which is preferably formed of a light metal having a relatively high coefficient of expansion such as an aluminum or magnesium alloy, is held in place upon the quill by means of the washer 18 and the nut 19, the thrust of the washer 18 against the race ring 16 being transmitted through the body of the wheel to the inner bearing 14, and pressing the race ring 13 against the spring 15. The spring 15 provides a yielding abutment which holds the ring 13 out of contact with the flange 11 of the quill and provides a space which permits expansion and contraction of the metal wheel body due to heat without subjecting either the wheel body or the quill to excessive stresses.

The bearing-receiving aperture of the outer disk 23 is closed by a hub cap 26 which covers the end of the axle. A sealing ring 27 carried by the disk 23 engages the quill 8 inwardly of the bearing 17. The sealing ring 27 is formed of a suitable packing material to retain grease or oil in the bearing 17. The inner disk 22 carries sealing rings 28 and 29, which engage the quill on the inner and outer sides of the roller bearing 14 to confine grease or oil to the bearing 14. Inwardly of the sealing rings 27 and 28, oil trapping rings 30 are provided, the rings 30 being in the form of sheet metal disks attached to the inner surfaces of the disks 22 and 23 by screws 31. The rings 30 are spaced from the inner surfaces of the disks 22 and 23 to provide annular spaces 32 in which oil leaking past the sealing rings will be thrown outwardly by centrifugal force. At the outer peripheries of the annular passages 32, holes 33 are provided in the disks 22 and 23 through which oil may flow to the outside of the wheel.

The disks 22 and 23 serve as brake members as well as supports for the rim 20 and have converging conical outer portions 34 which are joined to the rim 20 centrally thereof. The disks 22 and 23 are preferably made integral with the inner and outer halves of the rim 20, to provide inner and outer wheel sections, the two sections having stepped faces 35 which abut centrally of the rim. At spaced points circumferentially of the rim, bosses 36 are formed at the juncture of the conical portions 34 with the rim, and bolts 37 passing through these bosses serve to clamp the halves of the wheel together. The inner and outer halves of the wheel are preferably in the form of castings with integral bracing webs 38 bridging the spaces between the conical portions 34 and the rim 20 at regularly spaced points throughout the circumference of the wheel. Between successive webs 38, a plurality of radial fins 39 are provided on the exterior faces of the conical portions 34 of the disks. The webs 38 and fins 39 provide a large external surface area for radiation of heat from the body of the wheel.

Figure 9:
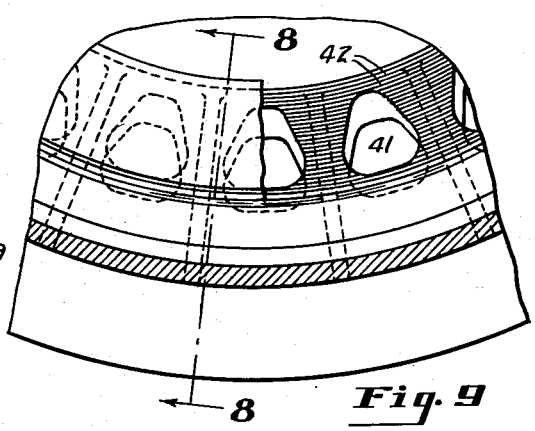
Fig. 9 is a transverse section through the peripheral portion of the wheel taken on the line indicated at 9—9 in Fig. 8.
Figure 8:
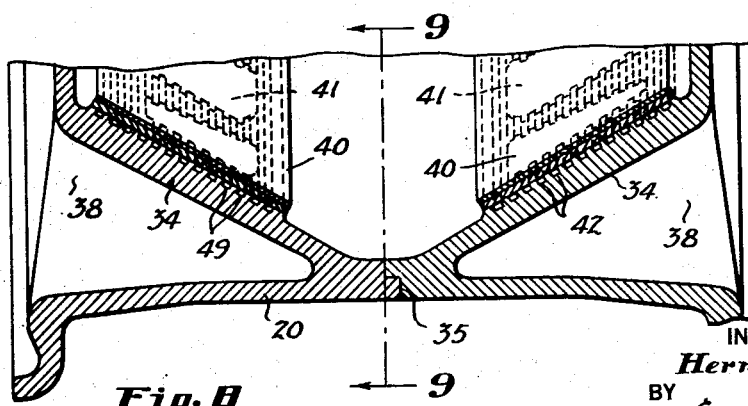
Fig. 8 is a section taken on the line indicated at 8—8 in Fig. 9.

Conical wear plates 40 are attached by suitable means to the interior faces of the conical portions 34. As best shown in Figs. 8 and 9, means may be provided to permit circulation of air between the wear plates 40 and the body of the disk to lessen the amount of heat conducted from the wear plates to the body of the wheel. Circumferentially spaced apertures 41 are provided in the body of the disks at regularly spaced intervals throughout the circumference; a series of parallel circumferential grooves 42 in the inner faces of the conical portions 34 provide passages for air along the outer faces of the plates 40 between the apertures 41.

The quill 8 has a central splined portion 43 upon which a torque disk 44 is fitted. The torque disk is held against turning on the quill 8 by the splined portion 43 and is held against axial sliding movement on the quill by means of a locking plate 45 (Figs. 4 and 6), which engages in a circumferential groove 46 in the quill. The locking plate is mounted for radial adjustment on the disk 44 into and out of engagement with the groove 46 to lock or release the torque disk, the plate being provided with a radial slot 47 which receives a screw 48 attached to the disk 44.

The disk 44 has laterally opening annular channels 49 in the opposite faces thereof. The channels 49 are arranged back-to-back and each has an inflatable annulus 50 mounted therein. Fluid under pressure is supplied to the annuli 50 from a pressure supply pipe 51 which is attached to a fitting 52 carried by the flange 3 on the axle. A pipe 53 is attached to the fitting 52 and extends axially through the portion of the quill upon which the bearing 14 is mounted and outwardly through an opening in the quill to a fitting 54 that is clamped in a transverse aperture formed in the disk 44 by means of a nut 55. The fitting 54 has a tubular inner end connected to the pipe 53, is closed at its outer threaded end and has lateral openings 56 which communicate with divergent passages 57 formed in the disk 44. The passages 57 extends outwardly to chambers 58 in the body of the disk 44 between the two channels 49.

Figure 7:
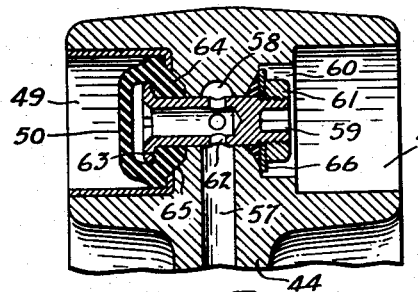
Fig. 7 is a section on an enlarged scale through the fluid induction stem of one of the inflatable annuli.

Each annulus 50 has a stem 59 which extends through the disk 44 and chamber 58 into a recess 60 formed in the bottom of the opposite channel 49. As best shown in Fig. 7, the end of the stem in the recess 60 is threaded to receive a clamping nut 61 and the stem has lateral openings 62 to the chamber 58, so that fluid under pressure from the pipe 51 will flow into the annulus. The stem 59 of one annulus 50 is spaced circumferentially from the stem 59 of the other annulus so that each annulus is independently clamped to the body of the disk 44 and the passage 58 extends from the stem of one annulus to the stem of the other. Each stem 59 has a head 63 within an annulus 50 and the inner wall of each annulus has a thickened portion 64 which extends into a recess 65 in the bottom of the channel 49, so that when the nut 61 is tightened the soft rubber of the inflatable annulus will be compressed in the recess 65 to insure a fluid-tight joint between the annulus and the stem. A packing washer 66 is also preferably inserted between the nut 61 and the bottom of the recess 66 to prevent leakage of fluid into the recess.

Figures 3, 4:
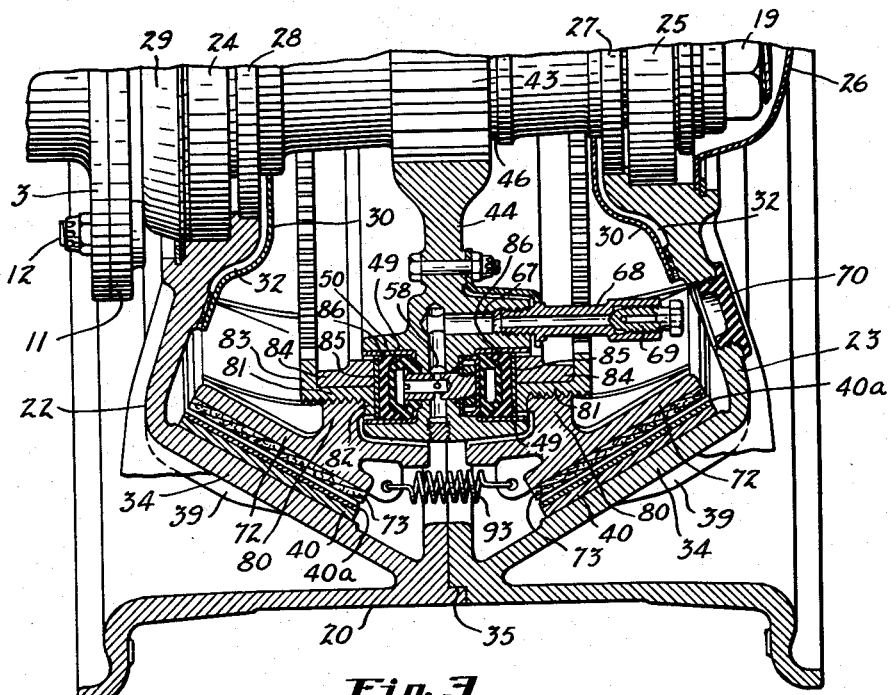
Fig. 3 is a section taken on the line indicated at 3—3 in Fig. 1.
Fig. 4 is a section taken on the line indicated at 4—4 in Fig. 1.
Figure 5:
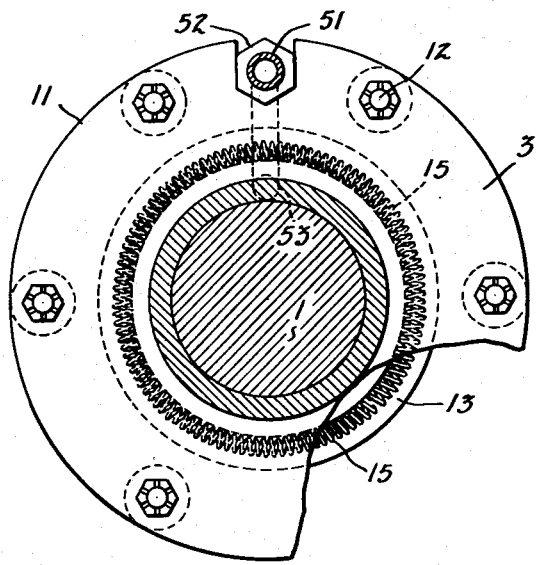
Fig. 5 is a section taken on the line indicated at 5—5 in Fig. 2.
Figure 6:
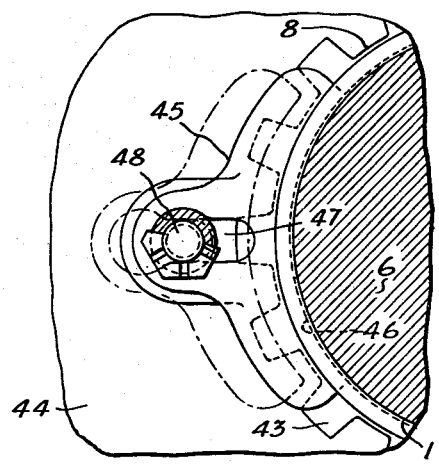
Fig. 6 is a fragmentary section on an enlarged scale taken on the line indicated at 6—6 in Fig. 4.

As best shown in Fig. 3, a passage 67 is provided in the body of the disk 44 for conducting fluid from the passage 58 to a lateral projecting fitting 68 which is provided with a threaded bleeder valve 69 at its outer end. The outer end of the fitting 69 is adjacent the outer disk 23 and the disk is provided with an opening, closed by means of a threaded plug 70, through which a suitable tool may be inserted to operate the bleeder valve. The bleeder valve 69 provides a means for releasing the pressure in the brake-applying annulus in case the pressure is not properly exhausted through the inlet pipe 51 upon release of the brake-applying pedal.

Figure 10:
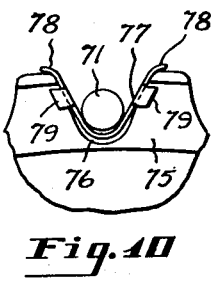
Fig. 10 is a fragmentary side elevation on an enlarged scale showing one of the spring-bearing members carried by the movable friction shoes.

Adjacent to its outer periphery and outwardly of the channels 49, the disk 44 carries a series of regularly spaced transverse pins 71, which project from opposite sides of the disk and provide supports for conical shoes 72 which slide axially on the pins toward and away from the conical portions 34 of the wheel disks 22 and 23. The shoes 72 are of identical construction and each is faced with a conical lining 73 engageable with the wear plate 40 on the adjacent wheel disk. Each shoe 72 has an inwardly projecting cylindrical web 74 which has a flange 75 at its inner end. The flanges 75 are provided with spaced pin-receiving recesses 76 (Fig. 10). The engagement of the pins 71 in the recess 76 restrains turning movement of the shoes 72 on the disk 44 and the pins 71 serve to support the shoes for axial movement toward and away from the opposite faces of the disk.

It is desirable that there be a yielding shock-absorbing connection between the shoes 72 and the disk 44 to cushion torsional impacts and such a connection is provided by U-shaped spring bearing members 77 mounted in each of the recesses 76. As best shown in Fig. 10, each bearing member 77 has end flanges 78 which engage with the exterior surfaces of the flanges 75 at opposite sides of the recesses 76 and side flanges 79, which engage with opposite side faces of the flanges 75. The end flanges 78 hold the central portions of the bearing members spaced from the bottoms of the recesses 76 and the side flanges 79 hold the bearing members against transverse movement with respect to the flanges 75. The curvature of the U-shaped bearing members is such that the bearing members are normally out of contact with the sides and bottom of the recesses. The pins 71 seat in the U-shaped bearing members 77 which are adapted to yield slightly under applied torque to absorb some of the shock when the shoes are brought into clutching engagement with the friction members of the wheel disks.

Each annular shoe 72 has an internally threaded inner portion 80 into which is screwed an externally threaded adjusting ring 81. The ring 81 has an outturned flange 82 at its inner end which limits the outward movement of the ring with respect to the shoe. At its outer end the ring 81 has an inturned flange 83. The ring 81 may be of relatively thin cross section and a stiffening ring 84 may be mounted interiorly of the cylindrical threaded portion, the flange 83 serving to position the stiffening ring 84. The inner end of the ring 81 lies within the channel 49 of the adjacent torque disk and the inner faces 49 of the flange 82 and of the stiffening ring 84 are disposed in a plane parallel with the plane of the bottom of the channel. A heat insulating pad 85 may be attached to the inner face of the ring 81 to impede transfer of heat from the friction members to the inflatable annulus.

Each annulus 50 is preferably formed of soft rubber such as employed in inner tubes for pneumatic tires so that it is freely expansible under internal fluid pressure. In order to protect this soft rubber annulus, an unattached sealing ring 86 is provided which is formed of rubber, preferably somewhat stiffer than the rubber of the inflatable annulus. Each sealing ring is of a radial width to slidably fit in its annular channel 49 and has inwardly projecting side flanges 87 which overlie opposite sides of the annulus 50. The sealing rings 86 fit snugly in the channel 49 in order to provide a fluid seal in the channel 49 outwardly of the annulus 50, so that rupture of an inflatable annulus will not prevent proper application of the brakes. The inflation of the annulus 50 exerts a lateral pressure on the flanges 87 to maintain sealing engagement between the edges of the ring 86 and the walls of the channel 49. The rings 86 have flat outer faces which are engageable with the heat-insulating pads 85 carried on the adjusting rings. The rings 86 are free from attachment to the walls of the channel, to the adjusting rings and to the inflation annuli. Lubricant, such as glycerine, may be provided between the contacting faces of each annulus 50 and its sealing ring 86 so that creeping of the unattached sealing ring will not unduly distort the annulus.

The flanges 83 of the adjusting rings 81 are provided with gear teeth 88 which form internal gears with which pinions 89 mesh. As best shown in Fig. 4, the pinions 89 are fixed to opposite end portions of a shaft 90 journaled in the body of the disk 44 inwardly of the channels 49. The shaft 90 has a squared outer end 91 adapted to receive a suitable actuating crank which may be inserted through the opening in the outer disk 23 which is closed by the threaded plug 70.

By reason of its large diameter, the threaded adjusting ring 81 provides a means for effecting very minute adjustments of the shoes 70 with respect to the wear plates 40. A large number of turns of the small pinions 89 is required to turn the ring 81 through a complete revolution and one turn of the shaft 90 will effect an adjustment of the shoes 72 which is but a small fraction of the pitch of the screw thread on the ring 81. Knowing the pitch of the thread on the ring 81, the amount of adjustment of the shoes 72 with respect to the friction members carried by the wheel body for each revolution of the shaft 90 may be readily computed, and, by counting the turns of the shaft 90, the amount of adjustment can be determined. In order to enable the operator to readily determine the amount of adjustment imparted to the shoes 72, one of the pinions 89 is provided with a recess which is engaged by a spring click 92, which makes an audible sound at the end of each rotation of the shaft 90. By counting the clicks, the exact amount of adjustment desired may be imparted to the shoes 72. Openings closed by threaded plugs 70a may be provided in the disks 22 and 23 adjacent the outer ends of the conical brake members to facilitate gauging the clearances between the brake members.

The inflatable annuli 50 serve to simultaneously force the shoes 72 outwardly into contact with the friction elements of the wheel disks and to maintain a heavy thrust against these shoes during the braking operation. Upon release of the fluid pressure, the shoes 72 are returned to disengaging position by means of a series of coil springs 93 connecting the inner ends of the shoes 72.

The wheel and brake of the present invention being mounted upon the quill 8 can be readily applied to or removed from a landing gear axle. Due to the abuse to which landing wheels are subjected in service, repair and replacement of tires and brake elements are frequently necessary. It is therefore highly advantageous to have wheels containing the entire braking mechanism which may be quickly and easily removed and replaced with other wheels, so that repairs on tires and brakes will not delay the operation of the airplane. It will also be apparent that, by reason of a relatively large radius of the frictional braking surfaces and by reason of their low angle of taper, preferably less than 45°, the brakes are capable of exerting a very great retarding force.

Both the brake and wheel structure are extremely rigid and the tire and brake actuating members are effectively protected against damage by heat conducted from the braking surfaces. Also, the expansion and contraction of the metal wheel body due to the heat generated by braking operations does not distort the quill because the connection between the wheel body and quill is such as to permit expansion and contraction of the wheel body without exerting excessive stresses on the quill.

In Figs. 11 to 14, inclusive, of the drawings, a modified form of torque disk is shown that is adapted to replace the disk shown in Figs. 1 to 4. The disk shown in Figs. 11 to 14 is similar to the disk above shown and described except that it is formed of two substantially identical sections 94 and 95 in the form of disks joined together face to face. The separable sections 94 and 95 serve to clamp sealing rings 96 and 97, which provide the peripheral boundaries of internal fluid pressure chambers 98 and 99 formed by registering recesses on the inner faces of the disks. The sections 94 and 95 are clamped together by suitable clamping bolts 100, by means of which sufficient pressure may be exerted upon the sealing rings 96 and 97 to provide an effective seal against leakage of fluid pressure from the chambers 98 and 99.

Figure 11:
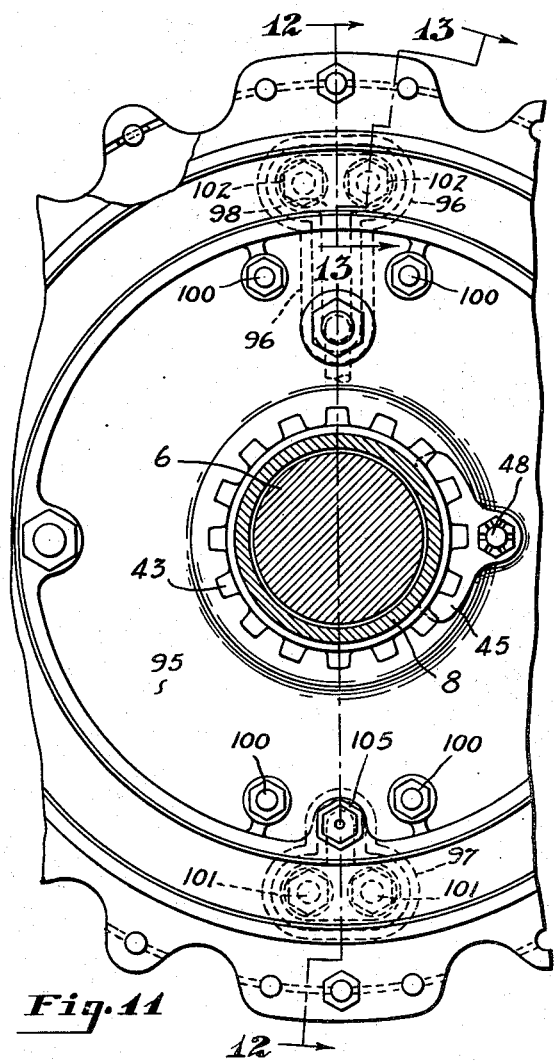
Fig. 11 is a side elevation showing a modified form of torque disk.
Figure 12:
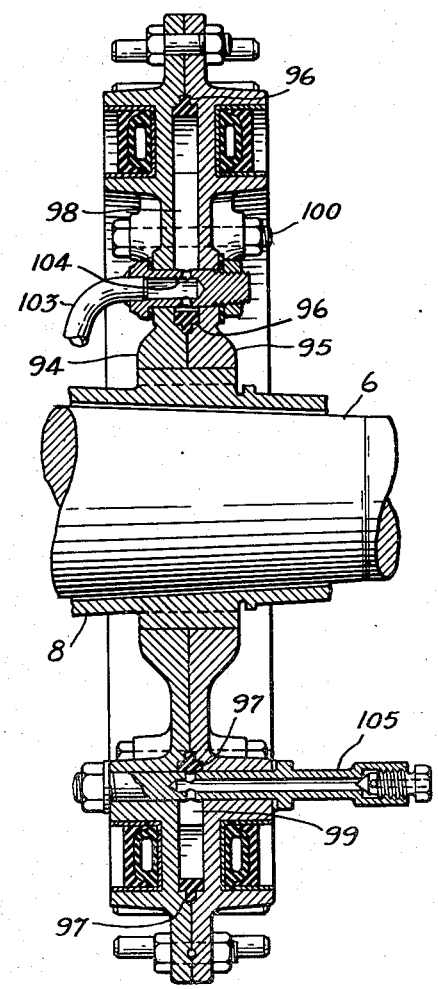
Fig. 12 is a section taken on the line indicated at 12—12 in Fig. 11.
Figure 13:
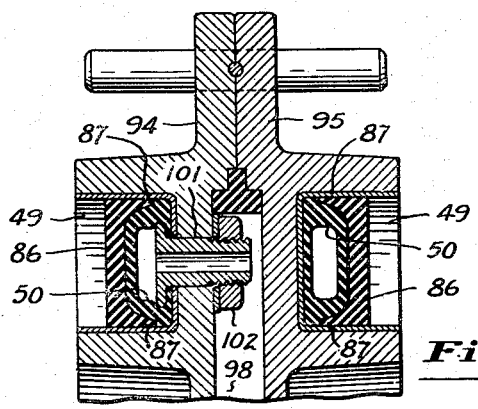
Fig. 13 is a section taken on the line indicated at 13—13 in Fig. 11.
Figure 14:
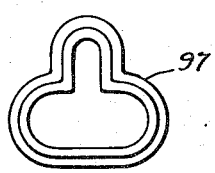
Fig. 14 is a plan view of one of the packing rings.

The disk sections are provided with channels 49 to receive the inflatable annuli 50 and fluid under pressure is introduced into the inflatable annuli 50 through the chamber 98. Each annulus has a tubular stem 101 which has an inner threaded end which lies within the chamber 98, a nut 102 being provided to clamp the stem 101 to the disk. As shown in Fig. 11, the stems of the two annuli are positioned side by side within the chamber 98. Fluid under pressure is supplied to the annuli 50 through a pressure pipe 103 which is attached to a fitting 104 extending through the disk 44 and through the chamber 98 within the sealing ring 96, the fitting 104 being apertured to permit flow of fluid into the chamber 98. The chamber 99 provides an outlet to a bleeder fitting similar to that previously described and the chamber 99 contains two stems 101 side by side which establish communication between the chamber 99 and the interiors of the two inflatable annuli. The bleeder fitting 105 extends through the chamber 99 within the ring 97. By means of the sealing rings 96 and 97, leakage of fluid under pressure from the interior of the disk is effectively prevented.

In Figs. 15 and 16 of the drawings, the invention embodies a modified form of torque disk and is shown applied to a heavy-duty clutch. The clutch is interposed between two aligned shafts 106 and 107, the shaft 106 having a drum 108 mounted thereon, the flange portion of which has two outwardly converging conical friction surfaces 109 and 110. The shaft 107 has a splined end 111 upon which a torque disk 112 is fitted. The torque disk 112 has spaced transverse pins 113 adjacent its periphery which correspond to the pins 71, above described. The pins 113 provide sliding and driving supports for conical shoes 114 which are axially movable into and out of engagement with the conical surfaces 109 and 110.

The shoes 114 and the surfaces 109 and 110 are preferably disposed at angles of less than forty-five degrees to the axis, so that tight wedging engagement is effected when lateral thrust is applied to the movable shoes 114. Adjacent their inner ends, the shoes 114 are provided with inwardly projecting flanges 115, which are provided with spaced recesses 116 to receive the pins 113. The U-shaped spring bearing members 117 corresponding to the bearing members 77, previously described, are provided in the recess 116 to provide a yielding driving connection between the shoes 114 and the disk 112. Adjacent the pins 113 and inwardly thereof, the disk is provided with regularly spaced apertures 118 which receive coil springs 119, which are attached at their opposite ends to the shoes 114 and serve to normally hold the shoes out of engagement with the drum surfaces 109 and 110 and to disengage the shoes upon release of pressure. Each of the shoes 114 has an inwardly offset inner portion 120 which extends into the channels 121 of the disk which correspond exactly to the channels 49 in the modification previously described. An inflatable annulus 122 is mounted in each channel 121 and a sealing ring 123 corresponding to the ring 86, previously described, is interposed between each annulus and each offset portion 120 of the friction shoes.

The disk 112 has a hub portion 125 which is formed separately from the body of the disk and which has a cylindrical exterior face 126 and an outwardly projecting circumferential flange 127 at one end of the cylindrical face 126. The body portion of the disk 112 has a widened inner portion 128 which has a cylindrical surface 129 opposed to the cylindrical surface 126 of the hub and an inwardly extending peripheral flange at one end of the cylindrical surface 129. A series of flat annular rubber disks 131 are interposed between the hub 125 and the enlarged portion 128, with their inner and outer edges engaging the opposed cylindrical surfaces 126 and 129. Inner and outer spacing washers 132 and 132a are interposed between the disks 131 to hold the disks in slightly spaced relation. The washers 132 and 132a are splined to the hub 125 and enlarged portion 128 and the interiors of the outer washers 132a are spaced from the peripheries of the washers 132 in order to permit flexing of the rubber disks 131.

The disks 131 are held in place by bolts 133 and 134, which extend through the flanges 127 and 130, through the disks 131 through the clamping washers 132 and 132a and through clamping rings 135 and 136, which are slidable on the hub 125, and within the enlarged portion 128, respectively. In order to make them more flexible, the disks 131 may be provided with spaced holes 137 in the portions thereof which lie between the inner and outer spacing washers 132 and 132a. The rubber disks 131 provide an elastic torque-absorbing connection between the friction shoes 114 and the shaft 107, the elastic disks permitting a limited amount of turning movement of the shaft 107 within the shoes to absorb the impact shock when the friction shoes are suddenly applied to a rapidly revolving drum. Fluid under pressure for inflating the rubber annuli 122 is introduced through a flexible pipe 138 which connects a passage 139 in the body of the disk 112 with an axial passage 140 in the shaft 107.

It will be apparent that the torque disks, friction elements, shoe adjusting means and fluid pressure actuating devices herein disclosed are applicable to either brakes or clutches, that the various modifications of the above mentioned features are to be considered to be applicable to either clutches or brakes and that many variations of the specific structure herein shown and described are within the scope of the invention.

What I claim is:

1. A wheel and brake for airplanes comprising a quill adapted to be detachably mounted upon an axle, a wheel body rotatably mounted upon said quill, said wheel body comprising a rim and a pair of rim supporting disks apertured to receive said quill and having converging conical outer portions joined to said rim centrally thereof, a torque member attached to said quill and disposed centrally between said wheel disks, an annular brake member on each side of said torque member, each brake member having a conical portion underlying the conical portion of the adjacent wheel disk, means disposed adjacent the larger diameter ends of the conical portions of the annular brake members and adjacent the center plane of the wheel for supporting said annular brake members on the torque member for axial movements toward or away from the torque member and for holding said annular brake members against turning movements with respect to the torque member, and means for simultaneously moving said annular brake members into engagement with the wheel disks.

2. A wheel and brake for airplanes comprising a quill adapted to be detachably mounted upon an axle, a wheel body rotatably mounted upon said quill, said wheel body comprising a rim and a pair of rim supporting disks apertured to receive said quill and having converging conical outer portions joined to said rim centrally thereof, a torque disk attached to said quill and disposed centrally between said wheel disks, an annular brake member on each side of said torque disk, each brake member having a conical portion underlying the conical portion of the adjacent wheel disk, supporting means for the annular brake members carried by the torque disk and disposed adjacent the center plane of the wheel and between the larger diameter ends of the conical portions of said brake members, an inflatable annulus interposed between each brake member and the torque disk, and means for delivering fluid under pressure to said annuli.

3. A wheel and brake for airplanes comprising a quill adapted to be detachably mounted upon an axle, a wheel body rotatably mounted upon said quill, said wheel body comprising a rim and a pair of rim supporting disks apertured to receive said quill and having converging conical outer portions joined to said rim centrally thereof, said conical portions being inclined at an angle of less than 45° to the wheel axis, a torque disk attached to said quill and disposed centrally between said wheel disks, an annular brake member on each side of said torque disk, each annular brake member having a conical portion of substantially the same inclination as the conical portion of the adjacent wheel disk and underlying said conical portion of the wheel disk, interengaging members carried by the torque disk adjacent its periphery and by the brake members between the larger diameter ends of their conical portions for slidably supporting said annular brake members for axial movements toward and away from said torque disk and for holding said brake members against rotation with respect to said torque disk, and means for simultaneously moving said brake members axially to engage the conical portions thereof with the conical portions of the wheel disks.

4. A wheel and brake for airplanes comprising a quill adapted to be detachably mounted upon an axle, a wheel body rotatably mounted upon said quill, said wheel body comprising a rim and a pair of rim supporting disks apertured to receive said quill and having converging conical outer portions joined to said rim centrally thereof, said conical portions being inclined at an angle of less than 45° to the wheel axis, a torque disk attached to said quill and disposed centrally between said wheel disks, annular brake members having conical portions of substantially the same inclination as the conical portions of the adjacent wheel disk and underlying said conical portions of the wheel disk, interengaging members carried by the torque disk adjacent its periphery and by the brake members between the larger diameter ends of their conical portions for slidably supporting said annular brake members for axial movements toward and away from said torque disk and for holding said brake members against rotation with respect to said torque disk, an inflatable annulus interposed between the torque disk and each of said annular brake members, and means for delivering fluid under pressure to said annuli.

5. A wheel and brake for airplanes comprising a quill adapted to be detachably mounted upon an axle, a wheel body rotatably mounted on said quill, said wheel body comprising a peripheral tire supporting rim and a pair of rim supporting disks having substantially parallel inner portions apertured to receive said quill and converging conical outer portions joined to said rim centrally thereof, a torque disk attached to said quill centrally thereof, an annular brake member on each side of said torque disk coaxial therewith and movable laterally with respect thereto, said disk and brake members having portions adjacent their outer peripheries that interengage to hold the brake members against rotation relative to the disk, means for yieldably pressing said brake members toward said torque disk, and means carried by the torque disk inwardly of said interengaging portions for simultaneously moving said brake members away from the central torque disk to engage the same with the conical portions of said wheel disks.

6. A wheel and brake for airplanes comprising a wheel body composed of inner and outer sections joined together in a median plane, each section comprising a disk and an integral rim flange, said disks having parallel widely spaced inner portions provided with aligned central axle-receiving apertures and converging conical outer portions, bolts adjacent the flanges for securing the sections together, a quill mounted in the disk apertures, bearings interposed between said disks and said quill, a torque disk attached to said quill centrally thereof, an annular brake member on each side of said torque disk coaxial therewith and movable laterally with respect thereto, said disk and brake members having portions adjacent their outer peripheries that interengage to hold the brake members against rotation relative to the disk, means for yieldably pressing said brake members toward said torque disk, and means carried by the torque disk inwardly of said interengaging portions for simultaneously moving said brake members away from the central torque disk to engage the same with the conical portions of said wheel disk.

7. A wheel and brake for airplanes comprising an axle-receiving quill, a torque disk attached to said quill centrally thereof, circumferentially spaced axially extending pins attached to said disk adjacent its periphery, an annular brake member upon each side of said disk, each brake member having peripheral portions adjacent opposite faces of the disk and provided with slots opening to the outer periphery thereof to receive said pins, said brake members having conical shoes which converge outwardly with their larger diameter ends upon opposite sides of said slotted portions, means for moving said brake members toward and away from said disk, and a wheel body rotatably mounted on said quill, said wheel body comprising a tire supporting rim, and spaced disks having converging conical outer portions overlying said conical shoes and joined to said rim centrally thereof.

8. A wheel and brake for airplanes comprising an axle-receiving quill, a torque disk attached to said quill centrally thereof, an annular brake member mounted for axial movement on each side of said torque disk, means for holding said brake members against rotation with respect to said disk, each of said brake members having a conical shoe, an inflatable annulus interposed between said disk and each of said brake members, means for introducing fluid under pressure into said annuli to move said brake members outwardly, and a wheel body rotatably mounted upon said quill, said wheel body comprising inner and outer sections joined in a median plane, each section comprising a disk portion and an integral rim flange at the periphery of the disk, said disks having parallel inner portions and converging conical outer portions which overlie said conical shoes, each of said wheel body sections having stiffening and heat dissipating webs extending across the space between the conical portion of the disk and the rim flange and integral with the disk and flange.

9. The combination with an axle and a wheel mounted on the axle and having a brake member thereon, of a torque disk carried by the axle and having a series of circumferentially spaced axially extending pins, an annular brake member slidable on said pins and engageable with the brake member of the wheel, said annular brake member having slots to receive said pins which extend radially inwardly from the periphery of the brake member, a resilient U-shaped pin seating member mounted in each of said slots, said U-shaped members being supported in the slots with the bottoms thereof spaced from the inner ends of said slots.

10. The combination with an axle and a wheel mounted on the axle and having a brake member thereon, of a torque disk carried by the axle and having a series of circumferentially spaced axially extending pins, an annular brake member slidable on said pins and engageable with the brake member of the wheel, said annular brake member having peripheral radially extending slots to receive said pins, the width of said slots being greater than the diameter of said pins, and a resilient U-shaped pin seating member of less depth than the slot mounted in each of said slots, each pin seating member having positioning flanges engaging the side faces of the brake member.

11. A wheel and brake for airplanes comprising an axle having a wheel supporting end portion, a flange fixed to said axle inwardly of said wheel supporting portion and provided with circumferentially spaced apertures, a quill having seating portions at its inner and outer ends engaging said axle adjacent said flange and adjacent the end of the axle, said quill having a flange at its inner end provided with pins engageable in the apertures of said flange, means including a nut on the outer end of the axle for clamping said quill against said flange, a wheel body rotatably mounted on said quill, said wheel body having a tire supporting rim and spaced disks provided with internal braking surfaces, roller bearings interposed between said disks and the inner and outer ends of said quill, a torque disk attached to said quill and disposed centrally between said wheel disks, axially movable brake members carried by said torque disk and engageable with the braking surfaces of the wheel disks, fluid pressure actuators for said axially movable brake members, and means including a conduit extending through the quill and beneath the inner wheel bearing for supplying fluid under pressure to said actuators.

12. A wheel and brake for airplanes comprising a quill adapted to be detachably mounted upon an axle, a wheel body rotatably mounted upon said quill, said wheel body comprising a rim and a pair of rim supporting disks apertured to receive said quill and having converging conical outer portions, brake shoes carried by the quill and engageable with the conical portions of the disks, and means for clamping the wheel body against axial movement on the quill, including a spring interposed between the wheel body and the clamping means at one side thereof to permit expansion of the wheel body independently of said quill.

13. A wheel and brake for airplanes comprising a quill adapted to be detachably mounted upon an axle and having an outwardly projecting flange at its inner end, a wheel body comprising a rim and a pair of rim supporting disks apertured to receive said quill and having converging conical outer portions, brake shoes carried by said quill and engageable with the conical portions of disks, means for clamping said wheel body against the quill flange, and a spring interposed between the wheel body and flange to permit expansion of said wheel body independently of said quill.

14. A wheel and brake for airplanes comprising a quill adapted to be detachably mounted upon an axle, a wheel body rotatably mounted upon said quill, said wheel body comprising a rim and a pair of rim supporting disks apertured to receive said quill and having converging conical outer portions, the conical portions of said disks having circumferentially spaced apertures and the internal surfaces thereof having grooves across the spaces between the apertures, friction wear plates secured to and covering the grooved conical surfaces, and brake shoes carried by the quill and engageable with said wear plates.

15. In a device of the character described, two coaxial relatively rotatable members, one of said members including a friction element having outwardly converging internal conical surfaces, a torque disk fixed to the other of said members and centrally disposed with respect to said conical surfaces, annular coaxial shoes slidably mounted on said disk and having external conical surfaces which conform to said internal conical surfaces, said disk and shoes having interengaging portions disposed adjacent their external peripheries for holding the same against relative rotation, and means disposed radially inwardly of said interengaging portions for simultaneously moving said shoes into or out of engagement with said internal conical surfaces.

16. In a device of the character described, two coaxial relatively rotatable members, one of said members including a friction element having outwardly converging internal conical surfaces, a torque disk fixed to the other of said members and centrally disposed with respect to said conical surfaces, pins carried by said disk adjacent its periphery, annular coaxial shoes having external conical surfaces which conform to said internal conical surfaces and having portions extending inwardly from the larger diameter ends of said external conical surfaces and slidably mounted on said pins, springs for normally holding said shoes against said disks, fluid pressure operated means interposed between each shoe and said disk inwardly of said pins, and means for conducting fluid under pressure to said fluid pressure operated means to press said shoes against the internal conical surfaces.

17. In a device of the character described, two coaxial relatively rotatable members, one of said members including a friction element having outwardly converging internal conical surfaces, a torque disk fixed to the other of said members and centrally disposed with respect to said conical surfaces, pins carried by said disk adjacent its periphery and adjacent the larger diameter ends of said conical surfaces, annular coaxial shoes slidably mounted on said pins and having external conical surfaces which conform to said internal conical surfaces, said conical surfaces having a taper of less than 45° with respect to their axis, and fluid pressure operated means disposed radially inwardly of said pins for pressing said shoes into engagement with said internal conical surfaces.

18. In a device of the character described, two coaxial relatively rotatable members, one of said members including a friction element having outwardly converging internal conical surfaces, a torque disk fixed to the other of said members and centrally disposed with respect to said conical surfaces, coaxial annular shoes on opposite sides of said torque disk, each having external conical surfaces conforming to said internal conical surfaces, means adjacent the larger diameter ends of said conical surfaces for slidably supporting said shoes for axial movements toward or away from opposite sides of said torque disk and for holding said shoes against rotation with respect to said disk, springs for normally holding said shoes in retracted positions, and fluid pressure means disposed radially inwardly of said supporting means for pressing said shoes against said friction member.

19. In a device of the character described, two coaxial relatively rotatable members, one of said members having outwardly converging conical internal surfaces, a torque disk fixed to the other of said members, a torque disk mounted upon the other of said members and positioned between said conical internal surfaces, circumferentially spaced axially extending pins carried by said disk and projecting to opposite sides thereof, shoes having external conical faces which conform to said conical internal surfaces, said shoes having notches opening to the external periphery thereof to receive said pins, fluid pressure actuating means interposed between said shoes and said disk radially inwardly of said pins, and means including a fluid passage in said disk for supplying fluid under pressure to said actuating means.

20. In a device of the character described, a torque disk having a laterally facing channel having concentric cylindrical side walls, an inflatable annulus in the bottom of said channel, an axially movable ring in the outer portion of the channel and supported independently of the channel, a friction shoe attached to said ring, a sealing ring interposed between said shoe-attached ring and the inflatable annulus, and means for inflating said annulus.

21. In a device of the character described, a torque disk having a laterally facing channel having concentric cylindrical side walls, an inflatable rubber annulus in the bottom of said channel, an axially movable ring in the outer portion of the channel and supported independently of the channel, an unattached sealing ring of rubber fitting in said channel and interposed between said independently supported ring and said inflatable annulus, and a friction shoe attached to said independently supported ring.

22. In a device of the character described, a torque disk having a laterally facing channel having concentric cylindrical side walls, an annular friction member mounted on the disk for axial sliding movement, said friction members being internally threaded, means for holding said friction member against turning movements with respect to said disk, an externally threaded ring screwed into said friction member and extending into said channel, an inflatable annulus in the bottom of said channel, an unattached sealing ring interposed between said inflatable annulus and said threaded ring, and means for turning said threaded ring to adjust said friction member axially.

23. In a device of the character described, a torque disk, circumferentially spaced axially extending pins attached to said disk, an annular friction member slidably mounted on said pins, said friction member being internally threaded, a ring screwed into said friction member, and an inflatable annulus interposed between said ring and said disk.

24. In a device of the character described, a torque disk, circumferentially spaced axially extending pins attached to said disk, an annular friction member slidably mounted on said pins, said friction member being internally threaded, a ring screwed into said friction member, an inflatable annulus interposed between said ring and said disk, and gearing for turning said ring.

25. In a device of the character described, a torque disk, circumferentially spaced axially extending pins attached to said disk, an annular friction member slidably mounted on said pins, said friction member being internally threaded, a ring screwed into said friction member, an inflatable annulus interposed between said ring and said disk, gearing for turning said ring, and a click associated with said gearing.

26. In a device of the character described, a torque disk, circumferentially spaced axially extending pins attached to said disk, an annular friction member slidably mounted on said pins, said friction member being internally threaded, a ring screwed into said friction member, an internal gear on said ring and concentric therewith, a pinion meshing with said gear, and a yielding click engaging said pinion.

27. In a device of the character described, a disk having a conical portion provided with circumferentially spaced apertures and parallel circumferential grooves, and a layer of wear-resistant material secured to the grooved face of the disk.

28. In a device of the character described, a torque disk having circumferentially spaced axially extending pins adjacent its periphery, an annular friction member having an annular rib provided with spaced slots opening to the external periphery thereof to receive said pins, and resilient U-shaped bearing members mounted in said slots in which said pins seat.

29. In a device of the character described, a torque disk having circumferentially spaced axially extending pins adjacent its periphery, an annular friction member having an annular rib provided with spaced slots opening to the external periphery thereof to receive said pins, and a U-shaped resilient bearing member mounted in each of said slots and each engageable with one of said pins to normally hold the same spaced from the walls of the slot.

30. In combination a pair of substantially coaxial relatively rotatable members, an annular friction member fixed to one of said members, a torque disk fixed to the other of said members, a series of circumferentially spaced axially extending pins carried by said torque disk, an annular friction member slidable on said pins and engageable with the first mentioned friction member, said slidable friction member having radially disposed slots to receive said pins, opening to a periphery thereof, and a resilient U-shaped pin seating member mounted in each of said slots with its bottom spaced from the bottom and side of the slot.

31. In combination a pair of substantially coaxial relatively rotatable members, an annular friction member fixed to one of said members, a torque disk fixed to the other of said members, a series of circumferentially spaced axially extending pins carried by said torque disk, an annular friction member slidable on said pins and engageable with the first mentioned friction member, said slidable friction member having radially disposed slots to receive said pins, opening to a periphery thereof, and a resilient shaped pin seating member mounted in each of said slots with the bottoms thereof spaced from the bottoms and sides of the slots, each pin seating member having positioning flanges engaging peripheral and side faces of the friction member.

32. In a device of the character described, a torque disk, a friction member having a conical engaging portion mounted coaxially with said disk and movable axially with respect to said disk, an annular web on said friction member adjacent the larger diameter of its conical portion and projecting axially past the large end of said conical portion, and members carried by said disk and engaging said web for holding said friction member against rotation with respect to said disk.

33. In a device of the character described, a torque disk having a laterally facing annular channel, the side walls of which are cylindrical and concentric, an inflatable annulus mounted in the bottom of said channel, a friction shoe coaxial with the disk and rotatable therewith, said shoe having a portion overlying the open side of said channel and a portion projecting axially into said channel, said shoe being movable axially with respect to said disk, an axially movable sealing ring slidable in said channel and interposed between said inflatable annulus and the axially projecting portion of said shoe, and means for inflating said annulus.

34. In a device of the character described, a torque disk having a laterally facing annular channel, the side walls of which are cylindrical and concentric, an inflatable annulus mounted in the bottom of said channel, a friction shoe coaxial with the disk and rotatable therewith, said shoe having a portion overlying the open side of said channel and a portion projecting axially into said channel, said shoe being movable axially with respect to said disk, an axially movable sealing ring slidable in said channel and interposed between said inflatable annulus and the axially projecting portion of said shoe, said sealing ring having rubber flanges slidably engaging the cylindrical walls of the channel and partially overlying the interior and exterior sides of the inflatable annulus, and means for inflating said annulus.

35. A wheel and brake assembly comprising a wheel body having a pair of disks with outer conical portions converging to a rim portion, a torque member between said disks, an annular brake member on each side of said torque member, each provided with a conical face underlying the conical portion of a disk, said brake members and said torque member having interengaging portions disposed adjacent their outer peripheries and between the larger diameter ends of said conical faces for supporting the brake members on the torque member and for holding them against turning movements with respect to the torque member, and fluid pressure operated means carried by the torque member inwardly of said interengaging portions for pressing said brake members against said disk.

HERMAN T. KRAFT.